United States Patent Office 3,632,856
Patented Jan. 4, 1972

3,632,856
SEPARATION OF ALDESTERS FROM AN
OXIDATION MIXTURE
Elmer J. Hollstein, Wilmington, Del., assignor to
Sun Oil Company, Philadelphia, Pa.
No Drawing. Continuation-in-part of application Ser. No.
576,241, Aug. 31, 1966. This application Mar. 7, 1969,
Ser. No. 805,360
Int. Cl. C07c 67/06
U.S. Cl. 260—469
6 Claims

ABSTRACT OF THE DISCLOSURE

Aromatic aldesters are separated and recovered from a mixture of esterified aromatic oxidation products by a process comprising forming water soluble bisulfite adducts of the aldehyde compounds with an alkali metal bisulfite, extracting the aldehyde bisulfite adducts with water, breaking the separated adducts with an acid or base, and selectively solvent extracting the aldesters from other aldehyde compounds.

---

This invention relates to the preparation and recovery of aldehyde esters of aromatic compounds. More particularly, this invention relates to the separation or recovery of said aldehyde esters in especially high purity. Still more particularly, the present invention is directed to the recovery of 2,6 aldehyde esters of naphthalene and close position isomers thereof and to the recovery of same in a high state of purity.

RELATED APPLICATIONS

This application is a continuation-in-part of my application Ser. No. 576,241 filed Aug. 31, 1966 now abandoned.

BACKGROUND OF THE INVENTION

In the prior art methods of preparing mixed aldehyde acids and aldehyde esters (or aldacids and aldesters, as they are frequently called) of aromatic compounds, various circuitous procedures have been resorted to obtain these bifunctional compounds in any reasonable degree of yields or purity. Other workers have persisted with more or less conventional oxidation procedures which have certain advantages; however, such methods do suffer the disadvantage of producing a complex mixture of closely related products which are difficult to separate, and the workers have had only limited success in the separation and recovery aspect, particularly in regard to high purity. Some methods employ hazardous or toxic compounds such as selenium in the processing; and, of course, a residual amount of these is necessarily found in the final product. In applications, as a fungicide in particular, hazardous or toxic compounds such as selenium are not tolerated in any detectable amounts by the F.D.A. (Federal Food and Drug Administration). It is, accordingly, highly desirous that a process be provided for preparing and recovering aldehyde esters of organic aromatic compounds, particularly the 2,6 and closely related isomers of naphthalene in good yield and a purity that meets the acceptable standards enforced by the F.D.A. as to a fungicide.

It is, accordingly, an object of this invention to prepare aldesters of naphthalene that meet F.D.A. requirements. It is another object to achieve a high reduction in the selenium content and other impurities where F.D.A. approval is not required, but high purity is important.

DESCRIPTION OF THE INVENTION

Viewed in one aspect, the invention is a proces for the preparation of aldehyde esters of aromatic compounds which process comprises the combination of steps set forth below.

(1) Oxidizing a dialkyl aromatic compound to produce a mixture of oxidation products comprising the corresponding aldacids of the dialkyl aromatics inter alia other oxidation products. Other oxidation products are the analogs of said aldacid, such as the dialdehyde, the diacid, the dialcohol, and the corresponding bi-functional compounds of a combination of the foregoing functional groups and the compounds possible with any of those functional groups in combination with unoxidized substituents on the aromatic nucleus.

(2) The mixture of oxidation products is treated with an alcohol to produce the corresponding esters of the various products containing an acid group.

(3) The mixture is then treated with an alkali metal bisulfite to form the alkali metal bisulfite adduct of the aldehyde compounds to make same water soluble.

(4) The aldehyde-bisulfite adducts are then extracted from the other compounds with water.

(5) The separated bisulfite adducts are then broken by adding an acid or a base.

(6) The mixture is then solvent extracted with, for example, ether to remove the aldehyde ester which is then obtained in a crystalline form in high purity upon evaporation of the solvent.

In another aspect, the invention can be viewed as the separation and recovery of aromatic aldehyde esters from a mixture of esterified oxidation products comprising corresponding difunctional diesters, dialcohols, dialdehydes, and mixed alcohol-esters and alkyl-substituted alcohols, esters, and aldehydes which involves only steps (3) through (6) in combination.

Before proceeding with a detailed discussion of examples of the procedure, it will be worthwhile to first discuss certain variables of the process.

The particular oxidation procedure is not important other than the proviso that some aldacid must be formed in order to make formation of the aldester possible. Thus, virtually a multitude of known oxidation procedures can be employed. Some of the known prior art oxidation procedures will require slight modifications which will be readily apparent to those skilled in the art, such as a shortened reaction time to obtain the aldacid. At least some modifications will be desirable to obtain the aldacid in good yield by some of the known processes as contrasted to a substantially complete oxidation to the diacid compounds. With such obvious modifications as aforementioned being desired or necessary in some cases, any of the well-known oxidation procedures can be employed. Such procedures are exemplified by French Pat. No. 1,282,785, which briefly employs $NO_2$ at a temperature of about 160° to 230° C. and at atmospheric pressure with a substantially inert solvent, preferably a chlorinated aromatic solvent such as trichlorobenzene); U.S. Patent No. 2,839,575 and British Pat. No. 823,437 (which teach processes which are broadly similar to the French patent); U.S. Patent Nos. 2,833,816, 3,089,906, and 3,089,907 (which teach processes employing an alkanoic acid solvent, a heavy metal [such as cobalt] catalyst, and a bromine activator at about 60° to 240° C. and about atmospheric pressure); U.S. Patent No. 2,867,674 (which teaches using a dilute $HNO_3$ solution at 450° F. under pressures); and U.S. Patent No. 2,415,800 (which teaches oxidizing with an HBr catalyst at a temperature above 100° C.). Preferably, the oxidation procedure is similar to that set forth in French Pat. No. 1,282,785.

The dialkyl aromatics which may be oxidized are generally those taught in the foregoing prior art; for example, xylenes; diethyl benzenes; methyl propyl benzenes; ethyl hexyl benzenes; dihexyl benzenes; butyl dodecyl benzenes; methyl tetradecyl benzenes; didodecyl benzenes; ethyl eicosyl benzenes; dieicosyl benzenes; dimethyl naphthalenes such as 1,4-dimethyl naphthalene; 1-methyl-6-ethyl naphthalene; 2,6-dimethyl naphthalene; 1-methyl-5-hexyl naphthalene; 1-propyl-8-pentyl naphthalene; 2-ethyl-7-nonyl naphthalene; 2-butyl-6-decyl napthalene; 2,6-dibutyl naphthalene; 2,7-dihexyl naphthalene; 2-pentyl-6-dodecyl napthalene; 2,6-didoecyl naphthalene; 2-methyl-6-octadecyl napthalene; 2,6-dieicosyl; and the like. Preferably, the alkyl aromatic is the 2,6-and 2,7-dimethyl naphthalenes.

Illustrative of the products which are produced by the oxidation are compounds of the formula

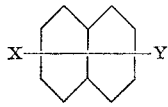

where X and Y can be as follows:

| X | Y |
|---|---|
| CH₃ | CH₂OH |
| CH₃ | CHO |
| CH₃ | COOH |
| CH₂OH | CH₂OH |
| CH₂OH | CHO |
| CHO | CHO |
| CH₂OH | COOH |
| CHO | COOH |
| COOH | COOH |

The alcohols which may be employed in the esterification procedure following the oxidation may be any aliphatic alcohol of 1–12 carbon atoms such as methanol, ethanol, propanol, hexanol, 4-propyl-nonanol, and dodecanol. The preferred alcohol is methanol. The temperature at which the esterification is to be carried out is about 100° to 200° C., and preferably 140° to 160° C. It will be found advantageous to employ an esterification catalyst such as $H_2SO_4$, $H_3PO_4$, $BF_3$, HF, and HCl. Of course, use of a catalyst will require removal of the catalyst following the esterification before further treatment is carried out according to this invention. The preferred esterification catalyst is 85 wt. percent sulfuric acid which may be readily removed following esterification by water extraction. Sufficient alcohol is to be employed to esterify all the acid groups. This is conveniently achieved by employing an excess of the alcohol. A sufficient excess is insured if at least one molecule of alcohol is employed for each alkyl substituent in the starting alkyl aromatic. The excess then aids in the step hereinbelow.

The alkali metal bisulfite adduct of the esters is formed by adding an alkali metal bisulfite to the esterified mixture of oxidation product. Preferably, the solid crude esterified oxidation product mixture is first dissolved in a suitable solvent, for example, an alcohol such as methanol. The alkali metal bisulfite is preferably employed in excess and as an aqueous solution of about 30 to 50 wt. percent concentration. The alkali metal bisulfites that may be employed are, for example, the bisulfites of sodium, potassium, lithium, and the like. Preferably, sodium bisulfite or potassium bisulfite, and most preferably sodium bisulfite, are employed. In embodiments wherein the esterified oxidation products are first dissolved in a solvent such as methanol before adding the alkaline metal bisulfite solution, the solid oxidation products are dissolved in boiling alcohol and then the alkali metal bisulfite is mixed with the alcohol-oxidation product solution at a temperature of about 10° to 50° C., and preferably about 25° to 30° C. The alcohol solvent here need not be specifically added as a separate step. It can be conveniently provided by using an excess of alcohol in the esterification step as described hereinabove. Essentially all of the organic oxidation products precipitate from the aqueous alcoholic bisulfite solution with the aldehyde groups in the form of bisulfite adducts. All the oxidation products may not be precipitated initially; but if the alcohol and water are removed by evaporation, then all of the oxidation products will be recovered as solids.

The precipitate and other solid residue is then extracted with water to selectively remove the water-soluble, aldehyde adduct-containing compounds. The extraction of the bisulfite adduct is not particularly critical as to conditions but is preferably carried out at a temperature of about 20° to 30° C. using distilled water in a ratio of about 10:1 of water per mixture of crude bisulfite to be extracted.

The bisulfite adduct that is recovered as an aqueous extract can be quite easily broken by a relatively small shift in the pH; thus any acid or base may be employed for same, but preferably the more mild or weak acid or alkaline agents are employed such as sodium carbonate and dilute solutions of HCl, $H_2SO_4$, and NaOH. Preferably, sodium carbonate is used as the adduct-breaking agent in an aqueous solution of about 20 to 40 wt. percent concentration and about one volume of the carbonate solution per volume of the water extract. Preferably, the treatment with the sodium carbonate or other breaking agent is carried out in a phase-separating apparatus so as to facilitate the ultimate separation of the aldester.

After completing the breakdown of the bisulfite adduct, a solvent for the aldester which is not miscible with water, preferably diethyl ether, is then added to the mixture whereby two layers form. The aldester is in the ether layer, which is the top of the two liquid layers that form. The ether layer containing the aldehyde ester is then easily drawn off and is evaporated to dryness to produce the pure aldehyde ester in crystalline form. In the case of the 2,6-aldester of naphthalene, it is a solid and is a snow-white crystal. Typically, this step is carried out at about 20° to 30° C. although temperatures slightly lower or higher can be suitably employed.

All of the steps of this process are preferably carried out at atmospheric or autogenous pressure where a closed pressure vessel is employed.

In some cases the oxidation products will be found to contain some color bodies therein which color may be carried through at least in a light or pale shade unless a special color-removing treatment is employed. For example, the crystals of the 2,6-aldester of naphthalene were a pale yellow on occasion. In those cases a bright red to orange color of crude oxidation product mixture was the source of the separated aldester crystals. These crystals were made white by being passed to a Florisil (a registered trademark of Floridin Company for their magnesium silicate synthetic absorbent) and eluted with a 50:50 benzene-petroleum ether solution. Activated carbon or other absorbents may be used here or the treatment may be interposed at another point or several treatments at various other points in the process sequence as desired.

EXAMPLE I

The oxidation

To a 3-liter, 3-necked, Morton flask fitted with a high-speed stirrer are charged 125 g. of 2,6-dimethylnaphthalene, 62.5 g. of cobaltous acetate tetrahydrate, 6.25 g. of ammonium bromide, and 1250 ml. of glacial acetic acid. The mixture is heated to 100° to 110° C. The stirrer is set at high speed and oxygen is admitted to the bottom of the flask through a ¼″ I.D. gas delivery tube at a rate of 2 liters per minute. In the initial stage of the oxidation, the reaction is quite exothermic, and it is important to admit as much oxygen as necessary to prevent the formation of a vacuum in the flask. Thereafter, an oxygen rate of 2 liters per minute and a temperature of about 110° C. is maintained for 3 hours. The reaction is stopped, and the contents of the flask are poured into 10 liters of distilled water. The slurry is allowed to cool and is filtered. The solids are washed well with distilled water to eliminate acetic acid and are dried. Experience has shown that these solids consist of 40% 2,6-naphthalene dicarboxylic acid, 30% 2,6-aldacid, and 30% others.

Isolation and purification

After drying, the solids are esterified at 150° C. with methyl alcohol and sulfuric acid catalyst. The entire esterification product is contacted with 4 or 5 times its volume of distilled water, filtered, washed, and dried. Fifty grams of the resulting solids are dissolved in 4 liters of boiling methanol, treated with 5 g. of decolorizing carbon, and filtered into a large beaker. The methanol filtrate is kept at about 60° C., and 500 ml. of a 40% aqueous sodium bisulfite solution is added with stirring. A precipitate containing the aldehydes and other oxidation products forms immediately. The solution is kept at 60° C. for about 1 hour and is then evaporated to near dryness, during which other solids form. The residue containing the initial precipitate and other solids which form during the evaporation are now extracted repeatedly with distilled water. The liquid extract is charged to a separatory funnel, and 300 to 400 ml. of saturated aqueous sodium carbonate is added. A precipitate comprising a mixture of aldehyde compounds forms upon shaking. One liter of diethyl ether is now added to the separatory funnel. Shaking dissolves the precipitate and results in the formation of two liquid layers. The ether layer contains the aldester, and the ether-saturated water layer contains the other aldehyde compounds. The ether layer is separated and evaporated to dryness. Yellow solids remain which are about 99% 2,6-aldester. The solids are charged to a chromatography column filled with Florisil synthetic absorbent and eluted with a 50:50 benzene-petroleum ether solution. The solvent is evaporated, revealing snow-white crystals of 99+% 2,6-aldester. To be specific, the purity of the product is in excess of 99.99%. A neutron activation test analysis of the product shows no metals except about 4 parts per million of zinc and a lesser amount of chromium.

EXAMPLE II

When the foregoing separation and purification procedure was carried out on an oxidation product mixture obtained by carrying out the procedure set forth in French Pat. No. 1,282,785 inclusive of the additional oxidation promoter, selenium dioxide, the 2,6-aldester of naphthalene was likewise of 99.99+% purity. Specifically, a neutron activation analysis method could detect only about 33 parts per million of selenium.

The invention claimed is:

1. A process of separating and recovering aromatic aldesters which aldesters contain one aldehyde group and one ester group and contain an aromatic nucleus selected from the group consisting of benzene and naphthalene, wherein the aldehyde group is directly attached to a carbon atom in said nucleus and said ester group is directly attached to another carbon atom in said nucleus and wherein any alkyl groups on said aromatic compound contain from 1 to 20 carbon atoms, in high purity from a mixture containing the corresponding dialdehydes, dialcohols, diesters, alkyl-substituted monoalcohols, esters, and aldehydes which comprises the steps of:

(a) treating a solution of said mixture with an aqueous alkali metal bisulfite solution to form a precipitate of the corresponding alkali metal bisulfite adducts of the aldehyde compounds, (b) solvent extracting the precipitated aldehydebisulfite adducts with water to form an aqueous extract, (c) shifting the pH of the aqueous extract of (b) sufficiently to break the aldehyde-bisulfite adducts and form a precipitate of the aldester and (d) solvent extracting the precipitated mixture of (c) with diethylether, to remove said aldester and recovering said aromatic aldester from said solvent.

2. The process according to claim 1 wherein the mixture from which said aldesters are to be separated is first dissolved in a solvent before said alkali metal sulfite is added.

3. The process according to claim 2 wherein said alkali metal bisulfite is sodium bisulfite.

4. The process according to claim 3 wherein said sodium bisulfite is employed in a 30 to 50% aqueous solution.

5. The process according to claim 4 wherein said aldehyde-bisulfite adduct breaking agent of step (c) is sodium carbonate.

6. The process according to claim 1 wherein the aldester aromatic compound which is to be recovered is the 2,6-aldester of naphthalene.

References Cited

Migrdichian, Organic Synthesis, vol. I, p. 144.
Vogel, Practical Organic Chemistry, vol. VI, p. 935.

LORRAINE A. WEINBERGER, Primary Examiner

E. J. GLEIMAN, Assistant Examiner

U.S. Cl. X.R.
260—470, 476 R